United States Patent [19]

Vijayakumar et al.

[11] Patent Number: 5,189,917
[45] Date of Patent: Mar. 2, 1993

[54] ELECTRICAL MERCURY MANOMETER

[75] Inventors: Kallambella M. Vijayakumar; Junchang Dong, both of Brookline, Mass.

[73] Assignee: Trustees of Boston University, Boston, Mass.

[21] Appl. No.: 734,241

[22] Filed: Jul. 22, 1991

[51] Int. Cl.$^5$ .............................................. G01L 9/02
[52] U.S. Cl. ..................................... 73/750; 73/304 R
[58] Field of Search ...................... 73/750, 749, 304 R

[56] References Cited

U.S. PATENT DOCUMENTS

| | | | |
|---|---|---|---|
| 2,219,147 | 10/1940 | Binder et al. | 73/750 |
| 2,439,770 | 4/1948 | Brown et al. | 73/750 |
| 3,470,745 | 10/1969 | Frank | 73/750 |
| 3,577,785 | 5/1971 | Guevrekian | 73/750 |

Primary Examiner—Donald O. Woodiel
Attorney, Agent, or Firm—Iandiorio & Dingman

[57] ABSTRACT

A device for monitoring pressure variations for mercury manometers including; a manometer tube with a column of mercury; at least two taps in the tube with one tap in the mercury column and the other above the column; a power supply interconnected between the taps; a resistance element extending between the taps in the mercury; and means for sensing the output voltage across the taps representative of the variations in the shunting effect on the resistance element of the mercury column as it rises and falls with pressure.

3 Claims, 3 Drawing Sheets

ELECTRICAL MERCURY MANOMETER

FIELD OF INVENTION

This invention relates to an electrical mercury manometer, and more particularly to such an electrical manometer which continuously and automatically monitors the pressure.

BACKGROUND OF INVENTION

Mercury manometers are a standard apparatus for pressure measuring applications; they are simple, accurate and reliable. However, it is often necessary to monitor pressure continuously and automatically for which conventional manometers are unsuitable. Current commercial automated sensing apparatus, especially those with recording capability are generally complex and expensive.

SUMMARY OF INVENTION:

It is therefore an object of this invention to provide an improved manometer which provides a continuous electrical signal representative of pressure variations.

It is a further object of this invention to provide such an improved manometer which is compact, very inexpensive and accurate.

It is a further object of this invention to provide such an improved manometer which provides an electrical signal representative of pressure suitable for operating a recording device.

This invention results from the realization that a truly simple yet accurate and reliable manometer, for electrically and continuously monitoring pressures can be achieved by using a resistance element in the mercury column which connects to at least two taps, one of which is in the mercury and one of which is above the mercury, and sensing the change in resistance across the taps as the mercury shunts more or less of the element with the rise and fall of the mercury level.

This invention features a device which continuously, automatically, and electrically monitors the level of mercury in a manometer tube with at least two electrical taps, one disposed in the mercury and one above the mercury. A resistance element extends between the taps in the mercury. A power supply is interconnected between the taps. Sensing means, such as a potentiometer or a chart recorder, is included for sensing the output voltage across the taps which is representative of the variation in shunting effect on the resistance element of the mercury as it rises and falls with the change in pressure.

In a preferred embodiment the power supply may be a nine volt DC battery in series with a limiting resistor or any other power supply known in the art for such applications. The limiting resistor may be a variable resistor for selecting the optimum voltage which can be developed across the taps. The sensing means may be a voltmeter; a means to measure resistance; a chart recorder or any other device suitable for the particular monitoring and recording requirements. The device may also include a plurality of taps and switching means for selecting one of the taps disposed above the mercury column.

DISCLOSURE OF PREFERRED EMBODIMENT

Other objects, features and advantages will occur to those skilled in the art from the following description of a preferred embodiment and the accompanying drawings, in which.

The invention may be accomplished with a device which includes a manometer tube with a column of mercury and at least two electrical taps located within and above the mercury column respectively. The taps are spaced within the tube such that the rise and fall of the mercury column from pressure variations will occur between these taps.

Extending between the taps, within the manometer tube is a resistance element. Also interconnected between the taps is a power supply, a limiting resistor, and a potentiometer or a chart recorder which displays or records the voltage across the resistance element representing the shunting effect caused by the mercury column as it rises and falls with the variation in manometer pressure.

In other embodiments, the electrical mercury manometer may include a plurality of taps connected to the resistance element and switching means for selecting one of the taps disposed above the mercury column. In addition the limiting resistor and the potential of the power supply can both be adjustable for optimizing sensitivity and accuracy.

Figure 1:
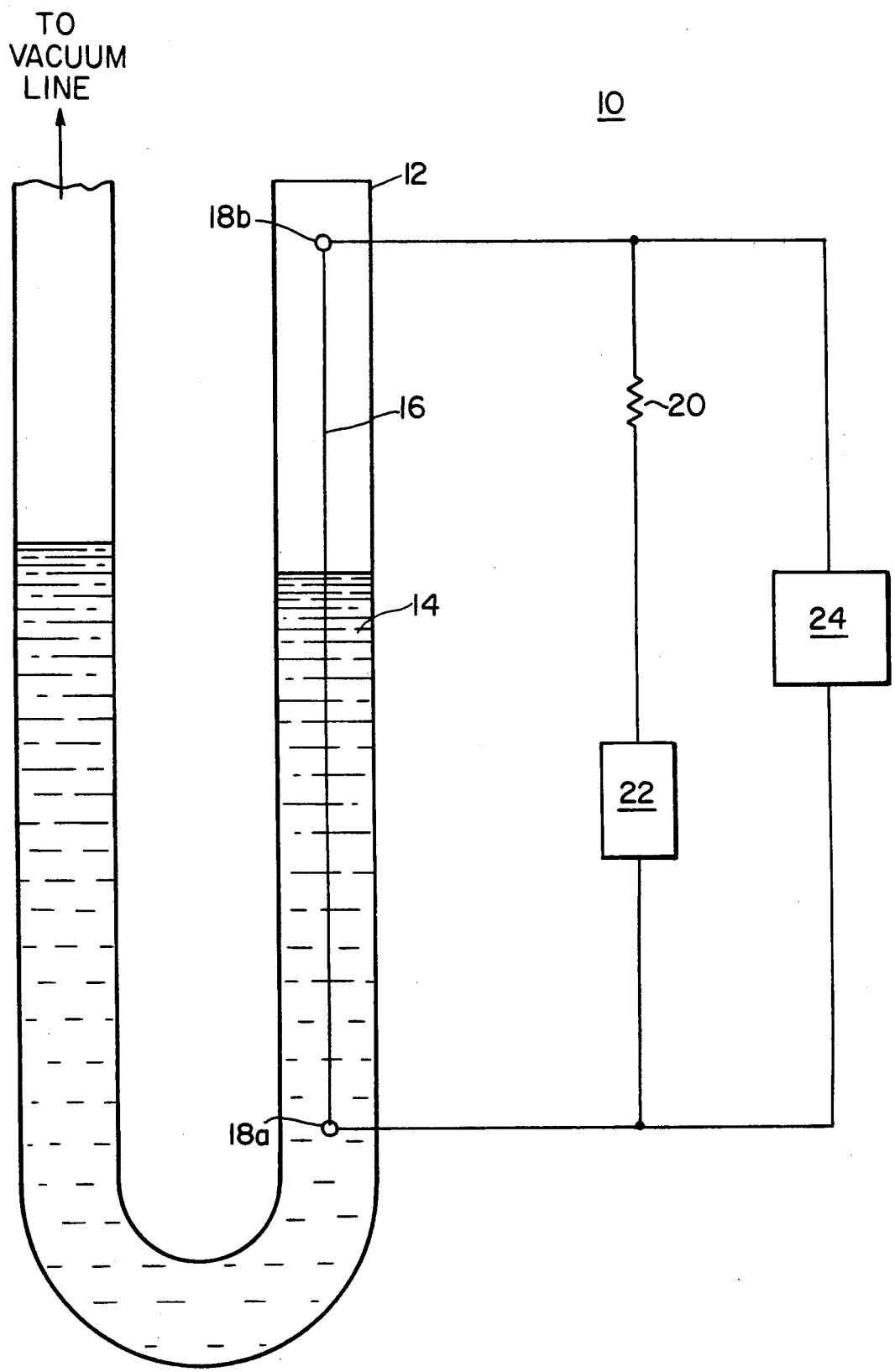
FIG. 1, is a schematic elevational view of an electrical mercury manometer according to this invention.

There is shown in FIG. 1, an electrical mercury manometer 10 according to this invention for the continuous monitoring of pressure variations. Mercury manometer 10 includes manometer tube 12 wherein mercury column 14 is located. Also located within manometer tube 12 is resistance element 16, which extends between electrical taps 18a, 18b; tap 18a is disposed within mercury column 14 and tap 18b is above the column. Limiting resistor 20 and power supply 22, are interconnected in series between taps 18a, 18b. Also interconnected between taps 18a, 18b and outside manometer tube 12 is sensing means 24 which is in parallel with limiting resistor 20 and power supply 22. Sensing means 24 may be a potentiometer or chart recorder.

In one construction, electrical mercury manometer 10 used for measuring pressures of the range of 1 to 760 torr may have a manometer tube 12 with a bore diameter of 6–8 mm. Resistance element 16 may be a constantan wire with a diameter of 0.05 mm and extending between taps 18a, 18b which are spaced 80 cm apart. Limiting resistor 20 may be 5 Kohm and power supply 22 may be a 9 v DC power supply. The sensing means 24 may be a millivolt meter.

For such a manometer, the maximum voltage that can be developed across resistance element 16 between taps 18a, 18b is about 10 millivolts, when mercury column 14 is not shunting any portion of resistance element 16. As mercury column 14 rises, a portion of resistance element 16 is shunted and the resistance or voltage measured between taps 18a, and 18b is reduced. The reduction in resistance and voltage is representative of the height of mercury column 14 and thus the pressure being measured. When the pressure being measured using such a manometer is 500 torr, 50 cm of resistance element 16 is shunted and the voltage across the taps is 3.75 millivolts. If the pressure being measured increases, the mercury column 14 rises, shunting more of resistance element 16 and correspondingly decreasing the voltage to be measured. In such a case, for a pressure of 760 torr, 76 cm of resistance element 16 is shunted and the voltage measured is 0.4 millivolts.

Figure 2:
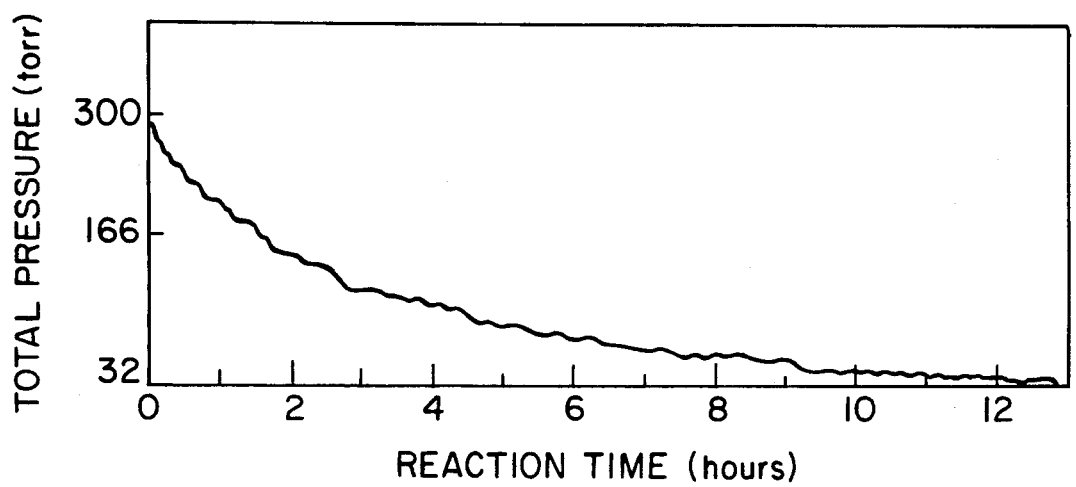
FIG. 2 is an example of a recording from a chart recorder when coupled to an electrical mercury manometer according to this invention.

FIG. 2 is a typical example of a recording from a chart recorder coupled to an electrical mercury manometer while pressure was continuously monitored and recorded without the presence of the researcher. The result shown is specifically for the case in which the photocatalytic decomposition of nitric oxide was studied and where the pressure of the closed system was being continuously monitored and recorded.

Figure 3:
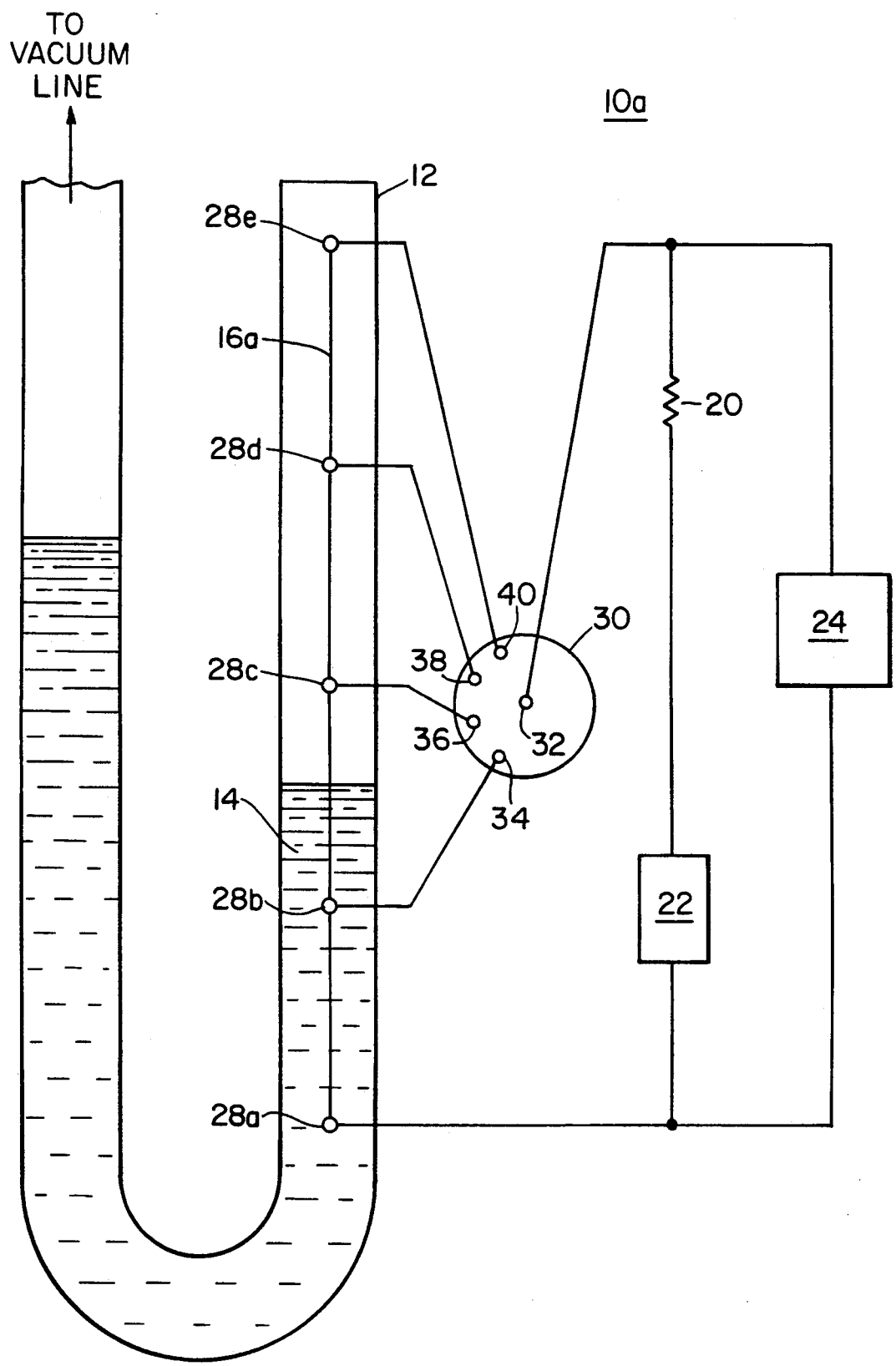
FIG. 3 is a schematic elevational view of an electrical mercury manometer according to this invention with a plurality of taps for providing a plurality of ranges of operation.

An electrical mercury manometer with a plurality of taps 10a, FIG. 3, includes resistance element 16a which is disposed between taps 28a and 28e. Additional taps 28b-d are connected to the resistance element at different locations and disposed between taps 28a and 28e to permit any one of a number of different ranges to be chosen so that maximum resolution can be achieved in each application. While taps 28b-e are shown as being spaced equidistantly, this is not necessary, the spacing of the taps may be varied. Also while FIG. 3 depicts five taps, more or fewer taps, but at least two may be utilized to meet the specific measuring needs and accuracy.

In FIG. 3, tap 28a is disposed within mercury column 14 and tap 28e is above the column. Taps 28b-d may or may not be within mercury column 14 depending upon the rise and fall of the column in response to the changes in the pressure being measured.

Taps 28b-e are connected to input contacts 34, 36, 38, and 40 of multipoint switch 30. The switch can selectively interconnect contacts 34, 36, 38 and 40 with output contact 32. Interconnected between contact 32 and tap 28a are the limiting resistor 20, power supply 22 and sensing means 24. For example, when contact 32 is interconnected to contact 34 the limiting resistor, power supply and sensing means are essentially interconnected between taps 28b and 28a for the lowest pressure range.

A plurality of taps provide a means to select the pressure range to be monitored. As explained above the resistance or voltage measured between a pair of taps is representative of the height of the mercury column between those taps and hence the pressure being measured.

Thus the advantage of a plurality of taps is that the sensitivity of the device to detect and monitor smaller pressure variations within that pressure range is improved. Further improvement can occur by calibration of the potentiometer, the chart recorder or other sensing means so as to give direct read-out of the pressure.

The above described electrical manometers can be readily adapted to other types of mercuric manometers including: the Bennert type, the inclined-type, the barometer and the McLeod Guage.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. An electrical mercury manometer, a mercury barometer or a vacuum gauge comprising:
   a manometer tube with a column of mercury;
   at least three electrical taps in said manometer tube disposed at least one in the mercury column and at least one above the mercury column;
   a switch means for selecting one of the taps disposed above said column of mercury;
   a power supply interconnected between the deepest tap disposed in the mercury column and said selected tap;
   a resistance element extending between said deepest tap in said mercury column and the highest tap above the mercury surface, the remaining taps connected to said resistance element at different locations; and
   sensing means for sensing the output voltage across said deepest tap and said selected tap representative of the variations in shunting effect on said resistance element of the mercury as it rises and falls with pressure.

2. The electrical manometer of claim 1 in which said power supply includes a battery and a limiting resistor in series; and said limiting resistor includes a variable resistance for selecting the full scale output developed across said taps.

3. The electrical manometer of claim 1 in which said power supply is adjustable.

* * * * *